US009603018B2

(12) United States Patent
Gonsalves et al.

(10) Patent No.: US 9,603,018 B2
(45) Date of Patent: Mar. 21, 2017

(54) PEER TO PEER REMOTE CONTROL METHOD BETWEEN ONE OR MORE MOBILE DEVICES

(71) Applicant: AetherPal Inc., South Plainfield, NJ (US)

(72) Inventors: Deepak Gonsalves, Bridgewater, NJ (US); Calvin Charles, Piscataway, NJ (US); Ranjithkumar Palanichamy, Woodbridge, NJ (US); Ramesh Parmar, Scotch Plains, NJ (US); Subramanyam Ayyalasomayajula, Kendall Park, NJ (US); Pooja Chengappa, Edison, NJ (US)

(73) Assignee: AETHERPAL INC., South Plainfield, NJ (US)

( * ) Notice: Subject to any disclaimer, the term of this patent is extended or adjusted under 35 U.S.C. 154(b) by 0 days.

(21) Appl. No.: 14/808,567

(22) Filed: Jul. 24, 2015

(65) Prior Publication Data

US 2016/0029216 A1 Jan. 28, 2016

Related U.S. Application Data

(60) Provisional application No. 62/029,021, filed on Jul. 25, 2014.

(51) Int. Cl.
| | |
|---|---|
| *H04M 1/66* | (2006.01) |
| *H04W 12/06* | (2009.01) |
| *H04W 8/00* | (2009.01) |
| *H04W 76/02* | (2009.01) |

(Continued)

(52) U.S. Cl.
CPC .......... *H04W 12/06* (2013.01); *H04L 67/025* (2013.01); *H04L 67/08* (2013.01); *H04W 8/005* (2013.01);
(Continued)

(58) Field of Classification Search
CPC ..... H04W 8/245; H04W 8/265; H04W 12/02; H04W 12/06; H04W 12/08; H04W 12/12; H04W 88/02; H04W 88/06
(Continued)

(56) References Cited

U.S. PATENT DOCUMENTS

| | | | |
|---|---|---|---|
| 7,558,862 B1 | 7/2009 | Tyukasz et al. | |
| 8,726,082 B2 * | 5/2014 | Moore | G06F 11/1443 714/18 |

(Continued)

*Primary Examiner* — Temica M Beamer
(74) *Attorney, Agent, or Firm* — Volpe and Koenig, P.C.

(57) ABSTRACT

Described herein is a method for providing peer to peer remote control management between a helper and a beneficiary mobile device. The method includes registering, by the helper and beneficiary mobile devices, with a secure server. The helper mobile device authenticates with the secure server. The helper or the beneficiary mobile device perform discovery with respect to the other device. A trust relationship is established between the helper and beneficiary mobile devices by performing mutual authentication. An auto connection discovery process is performed to determine if the helper and the beneficiary mobile devices are on a same sub network. A peer to peer connection is established between the helper and the beneficiary mobile devices if the helper and the beneficiary mobile devices are on the same sub network and a secure server mediates between the helper and the beneficiary mobile devices if they are on different sub networks.

38 Claims, 14 Drawing Sheets

(51) Int. Cl.
*H04W 76/04* (2009.01)
*H04L 29/08* (2006.01)
*H04L 29/06* (2006.01)
*H04W 12/08* (2009.01)

(52) U.S. Cl.
CPC ......... *H04W 76/02* (2013.01); *H04W 76/045* (2013.01); *H04L 63/029* (2013.01); *H04L 67/104* (2013.01); *H04W 12/08* (2013.01)

(58) Field of Classification Search
USPC .................. 455/410, 411, 41.2, 418, 419
See application file for complete search history.

(56) References Cited

U.S. PATENT DOCUMENTS

| | | | |
|---|---|---|---|
| 2010/0135473 A1* | 6/2010 | Dewing | H04L 29/06027 379/88.13 |
| 2011/0225417 A1* | 9/2011 | Maharajh | G06F 21/10 713/150 |
| 2012/0185559 A1* | 7/2012 | Wesley, Sr. | G06F 17/30424 709/217 |
| 2012/0254762 A1 | 10/2012 | Parmar et al. | |
| 2013/0064521 A1 | 3/2013 | Gonsalves et al. | |
| 2013/0260738 A1 | 10/2013 | Palanichamy et al. | |
| 2013/0263287 A1 | 10/2013 | Ayyalasomayajula et al. | |
| 2013/0263288 A1 | 10/2013 | Palanichamy et al. | |
| 2013/0344804 A1* | 12/2013 | Chen | H04B 5/02 455/41.1 |
| 2014/0310754 A1* | 10/2014 | Collart | G06F 17/30056 725/74 |
| 2015/0065114 A1* | 3/2015 | Dua | G06F 17/30058 455/418 |
| 2015/0074195 A1* | 3/2015 | Mani | H04L 67/104 709/204 |
| 2015/0245167 A1* | 8/2015 | Bobrow | H04W 4/008 455/41.2 |

* cited by examiner

PEER TO PEER REMOTE CONTROL METHOD BETWEEN ONE OR MORE MOBILE DEVICES

This application claims the benefit of U.S. provisional application No. 62/029,021, filed Jul. 25, 2014, which is incorporated by reference as if fully set forth.

TECHNICAL FIELD

This application is related to mobile wireless communication devices and, in particular, viewing and operating one or more mobile wireless communication devices remotely from another mobile wireless communication device.

BACKGROUND

In recent years, smart devices such as mobile phones, tablets, watches, wearables and the like are built with advanced computing capability and connectivity features. Early mobile phones contained relatively simpler features such as voice call, messaging, calendar and calculator. Modern smart devices include all of those features plus the features of a touchscreen computer, including web browsing, video recording, emails, and Wi-Fi and 3rd party applications. Most of these smart devices require elaborate configuration setups and extensive knowledge of the different applications to ensure proper functioning and operation of the device.

The increase in adoption of smart devices over the recent years along with the rise in complexity of the smart devices creates a need for anytime, anywhere support and better customer service tools. Majority of smart device users require some assistance with initial configurations and usage of these devices. Also, they are generally not skilled in trouble shooting issues that are considered technically advanced in nature. In many cases, the issues found by the users might be user error or faulty device configurations.

When a user has a problem with his/her smart device, they can call customer support to resolve the issue. In order to provide a personalized customer care experience, a customer support representative can engage Virtual Mobile Management Remote Control applications and services as described in U.S. Patent Publication No. US20120254762, entitled "VIRTUAL MOBILE MANAGEMENT REMOTE CONTROL", and U.S. Patent Publication No. US20130064521, entitled "SESSION RECORDING WITH EVENT REPLAY", and U.S. Patent Publication No. US20130263287, entitled "ACCESS CONTROL LIST FOR APPLICATIONS ON MOBILE DEVICES DURING A REMOTE CONTROL SESSION", and U.S. Patent Publication No. US20130260738, entitled "ROAMING DETECTION AND SESSION RECOVERY DURING VMM_RC", and U.S. Patent Publication No. US20130263288 "PASSWORD PROTECT FEATURE FOR APPLICATION IN MOBILE DEVICE DURING A REMOTE SESSION", the contents of which are hereby incorporated by reference herein, when applicable, to visually inspect the nature of the issue. In spite of customer care organizations having sophisticated tools for assistance, there is a still dissatisfaction among the smart device users about the efficiency, timeliness and consistency with which they receive assistance. Some of the common issues faced by users are long waiting periods for verification of identity and service entitlement, impersonal service where support agent isn't competent enough with a particular operating system or needs to transfer calls due to language barrier and inconsistencies in support experience where the user gets different responses from different types of interaction like chat, phone and remote support.

SUMMARY OF THE INVENTION

Described herein is a peer to peer remote control method through which a smart device user is able to remotely view, operate, control and draw on another smart device for the purpose of knowledge transfer, remote configuration and troubleshooting of the smart device. The peer to peer remote control system works in conjunction with a Virtual Mobile Management (VMM) or remote management system.

The method for peer to peer remote control might involve installing an application on the helper and the beneficiary smart devices for the purpose of viewing and operating a remote device, i.e. the beneficiary smart device. This application can either be pre-installed on the helper and the beneficiary smart devices by the device manufacturer or can be downloaded and installed from a secure server store post market.

When a smart device user needs assistance from another user, they can just call the person and request a remote connection. To initiate a connection from the helper's smart device, the helper might have to open the remote viewer application and enter the phone number, International Mobile Station Equipment Identity (IMEI) or email address of the remote device, i.e. the beneficiary smart device. The connection can also be initiated with pre-existing contacts on the phone or social media applications. When a connection request is sent to the beneficiary smart device, if a peer to peer client doesn't already exist on the beneficiary smart device, some form of download mechanism might be conveyed to the beneficiary smart device. For example, either the client itself might be forwarded to the beneficiary smart device for installation or a secure link to the download server could be sent to the beneficiary smart device.

Alternatively, the beneficiary can also initiate a request for connection from the peer to peer application installed on beneficiary smart device. A request can be made to contacts already existing on the beneficiary smart device or contacts from social media applications. When the request for connection is initiated from the beneficiary smart device, an SMS or email might be sent to the helper smart device. The system will automatically detect if the remote viewer application exists on the helper smart device and if a remote connection has been previously established with the helper smart device. If the application does not exist on the helper smart device, the SMS or email received from the beneficiary smart device will contain an instruction to install the application. The SMS or email might contain the actual application as an attachment or might contain a link to the secure server or mobile application store where the viewer application might be hosted. If the application already exists on the helper smart device and a connection was established with this the helper smart previously, then the application is brought to an active state by the SMS or email and a peer to peer connection is initiated with the beneficiary smart device so as to perform a peer to peer remote control management session.

If the application already exists on the helper smart device but no prior peer to peer connections were made with this device, then both the devices will go through a mutual authentication process to establish a trust between the two devices and then start a peer to peer connection so as to perform a peer to peer remote control management session.

One of the main purposes of this invention is to allow the helper to feel as if he/she is holding the beneficiary smart device in his/her own hands. Some of the important features available during a peer to peer remote control management session are described here. When a helper connects to a beneficiary smart device from the remote viewer application, the entire user interface on the beneficiary smart device is relayed on to the helper smart device. Every change on the beneficiary smart device screen, like change in time, widgets, live wallpapers, text entry, touch action, gesture action, orientation change, opening of applications and so on can be viewed on the helper smart device. An exception to this would be the password entry fields. When a password entry field is activated, this information will not be visible on the helper smart device for the purpose of privacy protection. Once the peer to peer connection and the peer to peer remote control management session is established, the helper can perform actions on the beneficiary's device remotely. This includes touch actions like tapping on an applications or menu, gesture actions like swiping on the device screen from top to bottom, bottom to top, left to right and right to left and long press actions that maybe used while customizing the device user interface. The software and hardware buttons on the device may also be mapped to the helper smart device. This allows the helper to control the buttons on the beneficiary smart device like volume buttons, home button and the back button remotely.

Another feature available is the ability to draw on the remote device, i.e. the beneficiary smart device. The helper can use the built-in drawing tool to draw a variety of images on the beneficiary smart device. This might include the ability to draw circles or squares, ability to draw lines and arrows, ability to draw free hand drawing on the remote device, i.e. the beneficiary smart device. This allows the helper to demonstrate how to perform certain actions on the beneficiary smart device and helps with knowledge transfer. This feature is especially useful when a beneficiary is new to smart devices and needs help in identifying different components of the device user interface.

Yet another feature available during the peer to peer remote control management method is the ability to pause the peer to peer remote control management session from the beneficiary's smart device. This feature allows the beneficiary to open personal applications and enter confidential data while still being on a peer to peer remote control management session with a relative or acquaintance. The beneficiary can also resume the peer to peer remote control management session at any point in time.

Yet another feature available during the peer to peer remote control management method is the ability to automatically reconnect back in case of network drops and failures. In order to establish a peer to peer connection for the purpose of performing a peer to peer remote control management session with another mobile device, a Wi-Fi or a mobile data network connection might be used. During the peer to peer remote control management session, if the beneficiary's smart device experiences a drop in network connection, then the remote support client will automatically reestablish the peer to peer remote control management session with the helper's smart device once it reconnects back to the network. This could be a seamless procedure with minimal user interaction.

Yet another feature available on the peer to peer remote control management method is the ability to switch back and forth between the remote viewer application and the original device on the helper smart device. While the helper is in a peer to peer remote control management session with a beneficiary smart device, the helper can switch back to his original device view at any point. The peer to peer remote control management session will remain unaffected. The helper can control the beneficiary smart remote device again by bringing the remote viewer application to the foreground. This feature is especially helpful when the helper needs to view incoming emails, messages and notifications on the helper smart device. This is also helpful when the helper needs to verify configurations and settings on their own device before making modifications on the beneficiary smart device.

Yet another feature available on the peer to peer remote control management method is the ability to blacklist certain applications on the beneficiary smart device to prevent access to these specific applications. In many cases the smart device users may have certain private and confidential applications on their device like banking applications or financial applications which contain secure data. The smart device users might not want the helper to view data within these applications. Security policies can be set on the peer to peer remote control management session to prevent the helper from viewing these pre-defined set of private applications.

Yet another feature available on the peer to peer remote control management method is the ability to grey-list certain applications on the beneficiary smart device to provide restricted access to these specific applications. In many cases, the mobile device users may have applications on the device which contains personal data like gallery, messaging, social media applications and so on. The mobile device user might not want the helper to view the contents of these applications unless absolutely necessary. Security policies can be set on the peer to peer remote control session to restrict access to a set of pre-defined personal applications. When these personal applications are invoked by the helper or the beneficiary, the beneficiary is requested for additional permissions to access the application.

Yet another feature available on the peer to peer remote control management method is the ability to whitelist applications on the beneficiary smart device. The whitelist feature can be utilized in cases where the mobile device user prefers to make only certain applications accessible to the beneficiary and restrict or deny access to all other applications on the beneficiary smart device.

Yet another feature available on the peer to peer remote control management method is the ability to terminate the remote control session on both the helper smart device and beneficiary smart device at any point during the session. This allows all parties involved to end the session at any time.

Some of the benefits of the peer to peer remote control management method is stated here. The peer to peer remote control management method allows smart device customers to seek help from their relatives and acquaintances when they require assistance on their device. This reduces calls to the customer support centers hence reducing Network Operator and Original Equipment Manufacturer costs.

Another benefit of the peer to peer remote control management method is the reduction in the number of devices being returned. When smart device customers are not familiar enough to use the device optimally and have difficulty receiving assistance, they might perceive a user error as a fault with the device. This might result in more devices being returned back (known as 'no fault found' NFF returns). The peer to peer remote control management method addresses such issues by allowing the smart device users to receive assistance anywhere and anytime easily.

Yet another benefit of the peer to peer remote control method is that the mobile device customers can get personalized help from relatives and acquaintances. There would be no language barriers since the support is received from known people. They would also have a relatively more comfortable and stress free experience as they would be receiving assistance from people they know. It would also be comforting to know that personal information is protected from outsiders.

The support process has been made relatively faster and more efficient by expanding the support group to family and friends and not just customer care organizations from network operators and device manufacturers. Repeat requests for support are relative simpler. It is almost like making a phone call to another mobile device user. This essentially makes anytime anywhere support a seamless experience.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

A more detailed understanding may be had from the following description taken in conjunction with the accompanying drawings wherein are set forth, by way of illustration and example, certain embodiments. The drawings constitute a part of this specification and include embodiments and illustrate various objects and features thereof.

DETAILED DESCRIPTION

Figure 1:
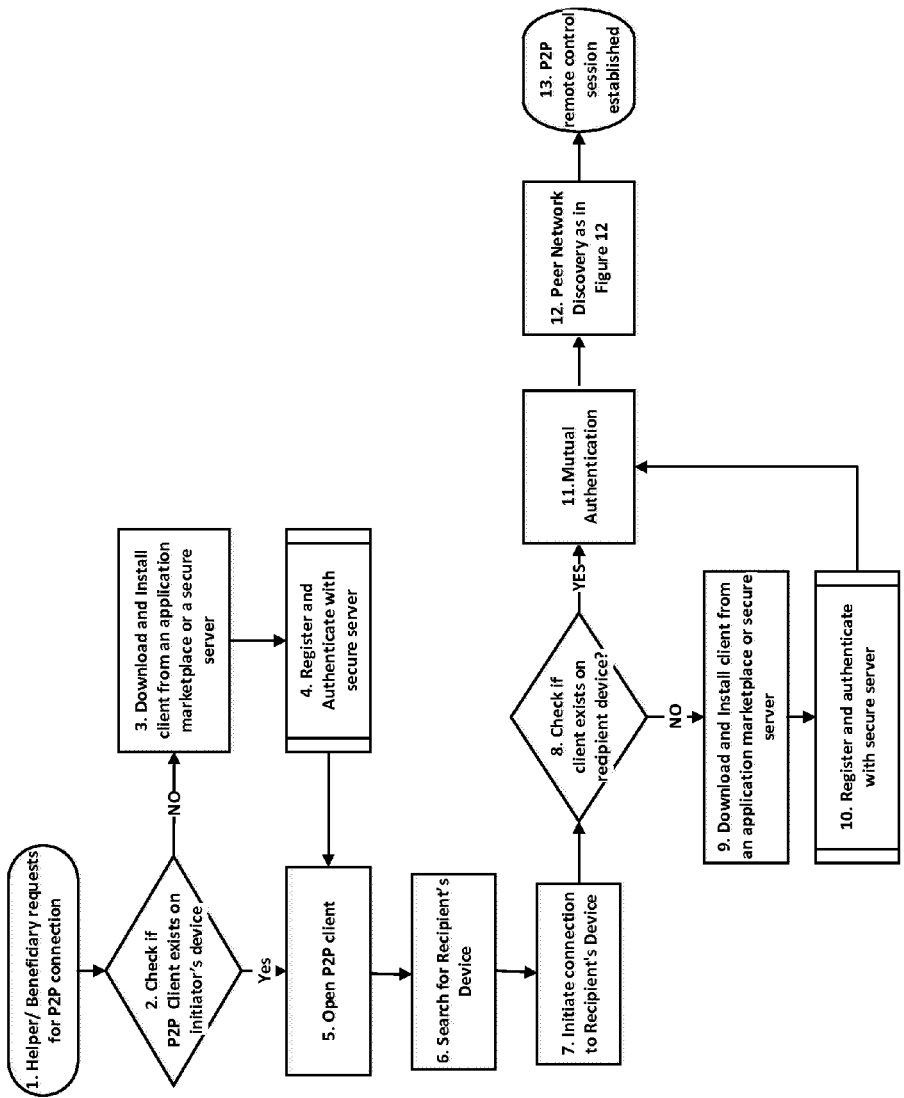
FIG. 1 is a flowchart describing the peer to peer remote control management set up procedure in accordance with some embodiments.

It is to be understood that the figures and descriptions of embodiments have been simplified to illustrate elements that are relevant for a clear understanding, while eliminating, for the purpose of clarity, many other elements. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein.

The current invention provides an extension to the Virtual mobile management remote control [VMM-RC] solution where a smart device customer or a user can request the assistance of acquaintances and relatives to get familiarized with the device, to configure the device correctly and troubleshoot any software issues on the device. Similar support model can also be used by employees of businesses to request support from its IT support organization. In this application, the person requesting for assistance will be referred to as the beneficiary and the person providing assistance will be referred to as the helper. This method allows the helper to use his or her smart device to remotely view and operate beneficiary's smart device as if the helper possesses the beneficiary's smart device in his/her hands.

Described below are some of the sample scenarios where peer to peer remote control management may be utilized.

In an example, a customer buys a smart device and needs help to understand how to use the device and make initial set up and configurations on the device. The customer can either call the mobile network operator customer service organization or original equipment manufacturer (OEM) customer service organization to request help, which would be a time consuming process. If the customer needs additional help at a later time, they would have to get back on a call with the customer service organization. The peer to peer remote control management method provides an easier solution by allowing the customer to request help from family or friends remotely, instantly eliminating any waiting time. Similar support model can also be used by employees of businesses to request support from its IT support organization.

In another example, a business user needs to access work related emails on his smart device but has recurring connectivity issues. Instead of having to call the operator or OEM customer service organization every time such an issue occurs, the customer can request his IT administrator or co-worker to remotely connect to his device and make the necessary configuration changes on the device hence saving the business user a lot of time and effort and experience better support.

In another example, a minor user such as a high school student wants to purchase mobile applications instantly for educational and other purposes but requires permissions and payment information to be entered on the device remotely. Parents can use the peer to peer remote control management method to remotely connect to their child's smart device to grant special privileges or enter onetime payment information through their smart device.

When a user wants to share pictures or videos with friends, they can do so using the remote view feature of the peer to peer remote control management method without having to download the video on any of the devices.

FIG. 1 describes an overall summary of the Peer to Peer remote control management set up procedure. In order to initiate a peer to peer connection for purposes of performing a peer to peer remote control management session, the Helper H and the Beneficiary B need to execute a series of algorithms. Initially the Helper H or Beneficiary B will request for a peer to peer connection [1]. The Helper H or Beneficiary B will then check to see if the peer to peer client which can be either the helper app [HApp] or the beneficiary app [BApp] exist on the initiator's device [2]. If the peer to peer application does not exist on the initiator's device, it will be downloaded and installed from an application marketplace or a secure server [3]. Once installed, the Helper app HApp or Beneficiary app BApp will need to register itself to the secure server S as described in detail in FIG. 3 and FIG. 4. Once the devices have registered themselves with S, the Helper H needs to authenticate itself with the server S [4] as described in FIG. 5. After registration and authentication with server S, the peer to peer client can be opened to initiate a peer to peer connection [5]. If the peer to peer client already exists on the initiator's device, no additional download and installation will be necessary. The initiator can search for recipient's device from within the application using various device identifiers like phone number, contact name, and the like. [6]. The initiator and recipient devices will perform a discovery procedure to identify each other. This is described in detail in FIGS. 6, 7 and 8. Once the initiator discovers the recipient's device, a connection request is sent to the recipient's device [7]. It is then checked to see if the peer to peer client exists on the recipient's device [8]. If the peer to peer client does not already exist on the recipient's device, it is downloaded and installed from an application marketplace or a secure server S [9]. The application is then registered and authenticated with the secure server S [10] as described in FIGS. 3, 4, and 5. If the client already exists on the recipient's device no additional downloads are performed on the device. Once the initiator and recipient devices have discovered each other, they go through a process of mutual authentication in order to establish a trust relationship [11] as described in FIG. 9. After mutual authentication, the helper and beneficiary go through an auto connection discovery process which involves determining if both the helper and beneficiary are on the same sub network [12]. If both the helper and the beneficiary are on the same sub network as detailed in FIG. 10, then a peer to peer connection is established between them. This is described in more detail in FIGS. 12, and 13. If the helper and the beneficiary are not on the same sub network, the server S and in specific, a component of the server S called the communication endpoint gateway (CEG) will mediate the peer to peer connection between the helper and the beneficiary as shown in FIG. 11. At this point peer to peer remote control management session is established between the initiator and recipient device [13].

Figure 2:
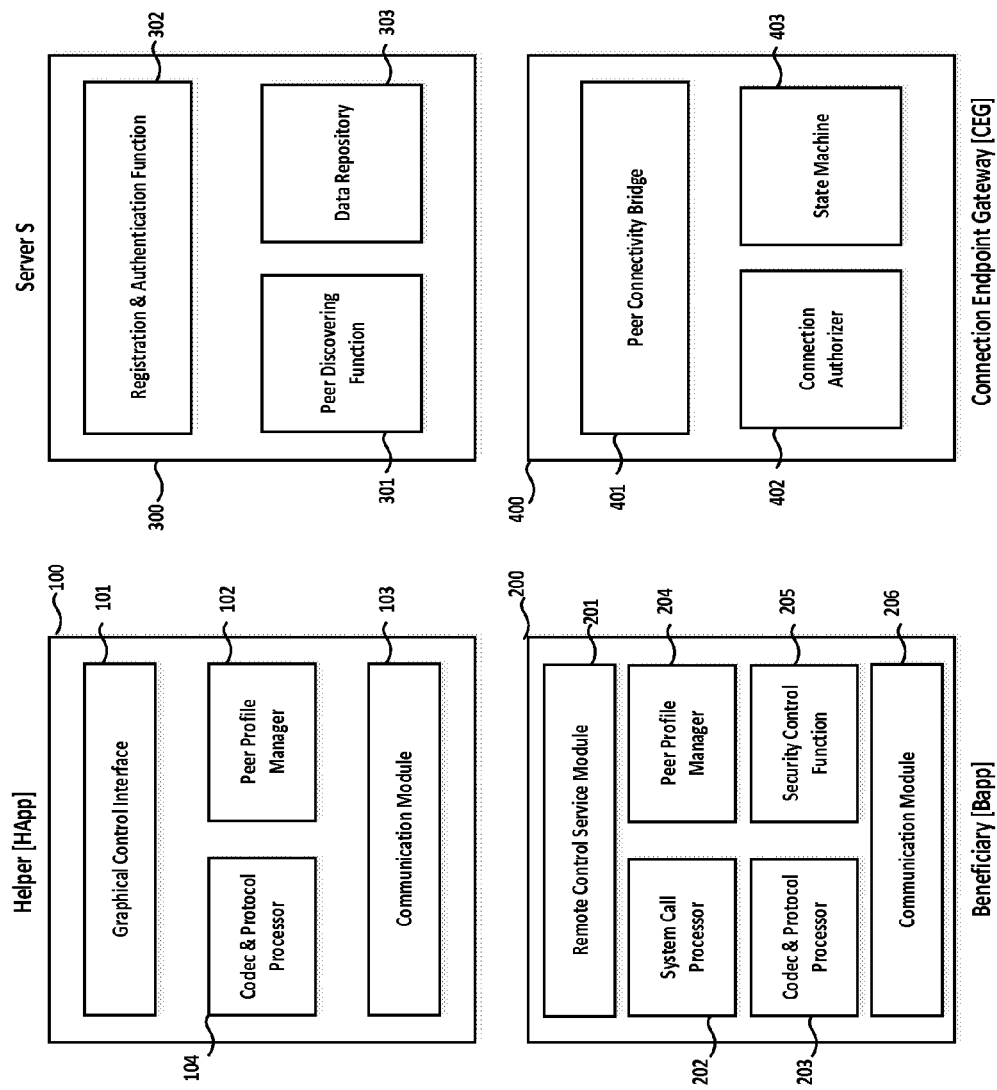
FIG. 2 shows the architecture of the peer to peer remote control management system in accordance with some embodiments.

FIG. 2 shows the architecture of the peer to peer remote control management system. The following are the different components of the system-HApp 100 is the application that is resident on the Helper device, BApp 200 is the application that is resident on the Beneficiary device, Server S 300 and the Communication Endpoint Gateway 400.

The Helper application HApp 100 has the following components-Graphical Control Interface 101, Peer Profile Manager 102, Communication Module 103, and Codec and Protocol Processor 104. The Graphical Control Interface 101 is responsible for receiving and displaying the benefi- ciary's smart device screen on the helper's user interface. The peer profile manager 102 is responsible for storing and managing the contact information of all known beneficiaries. The communication module 103 is responsible for setting up and maintaining a dedicated communication channel with the beneficiary smart device and the server. The codec and protocol processor 104 is a module that contains communication message encoding and decoding capabilities that includes the protocol layer as well as the application layer messages. These capabilities include message format, structure and data types used within the protocol messages.

The Beneficiary application BApp 200 has the following components-Remote Control Service Module 201, System Call Processor 202, Codec and Protocol Processor 203, Peer Profile Manager 204, Security Control Function 205 and Communication Module 206. Remote Control Service Module 201 is responsible for providing the remote control service. The key functions provided to manage devices remotely include: Display Capture—this method involves the capturing of the device screen; Key event Injection—this method involves the injection of key events into the device screen; and Touch event injection—this method involves the simulation of touch events on the device screen. The System Call Processor 202 is responsible for the invocation and translation of low level system calls (API) into commands that are translated into an abstract data structure that can be consumed by various modules within the application. The Codec and protocol processor 203 is a module that contains communication message encoding and decoding capabilities that includes the protocol layer as well as the application layer messages. These capabilities include message format, structure and data types used within the protocol messages. The peer profile manager 204 is responsible for storing and managing the contact information of all known helper devices. Security Control Function 205 is responsible to establish and maintain trust relationship with the server S. This module is further responsible to manage and protect mutual authentication profiles with helper devices and perform certificate/credential management functions. The communication module 206 is responsible for setting up and maintaining a dedicated communication channel with the beneficiary and the server.

The Server S 300 contains the following components—Registration and Authentication Function 302, Peer Discovering Function 301, Data Repository 303. The Registration and Authentication function 302 is responsible for enrolling the helper and beneficiary devices to server S and authenticating the devices. It is also responsible for user enrollment and user authentication. The Peer Discovery Function 301 is responsible for discovering the network endpoints for the helper and beneficiary device and to verify if the incoming request originated from valid authorized users. Data Repository 303 is the data warehouse that stores the information about the helper and beneficiary smart devices, server configuration, tasks and status settings. These databases are pivotal to configure and update managed devices and server components. It is also responsible for maintaining the user login information as well as device authentication information.

The primary responsibility of CEG 400 is to manage and mediate sessions such as a peer to peer remote control management session. The server provides communication endpoints between helper 100 and Beneficiary 200. The CEG 400 provides a consistent manner of device connection and Tool service in a system with heterogeneous devices running different operating systems. CEG 400 is comprised of the Peer Connectivity Bridge 401, Connection Authorizer 402 and the State machine 403. The primary function of 401 is to mediate all remote control traffic between Helper 100 and Beneficiary 200. Connection Authorizer 402 receives the communication endpoint data for helper and beneficiary and authenticates all inbound connections. The state machine 403 maintains the different states of the CEG 400.

Figure 3:
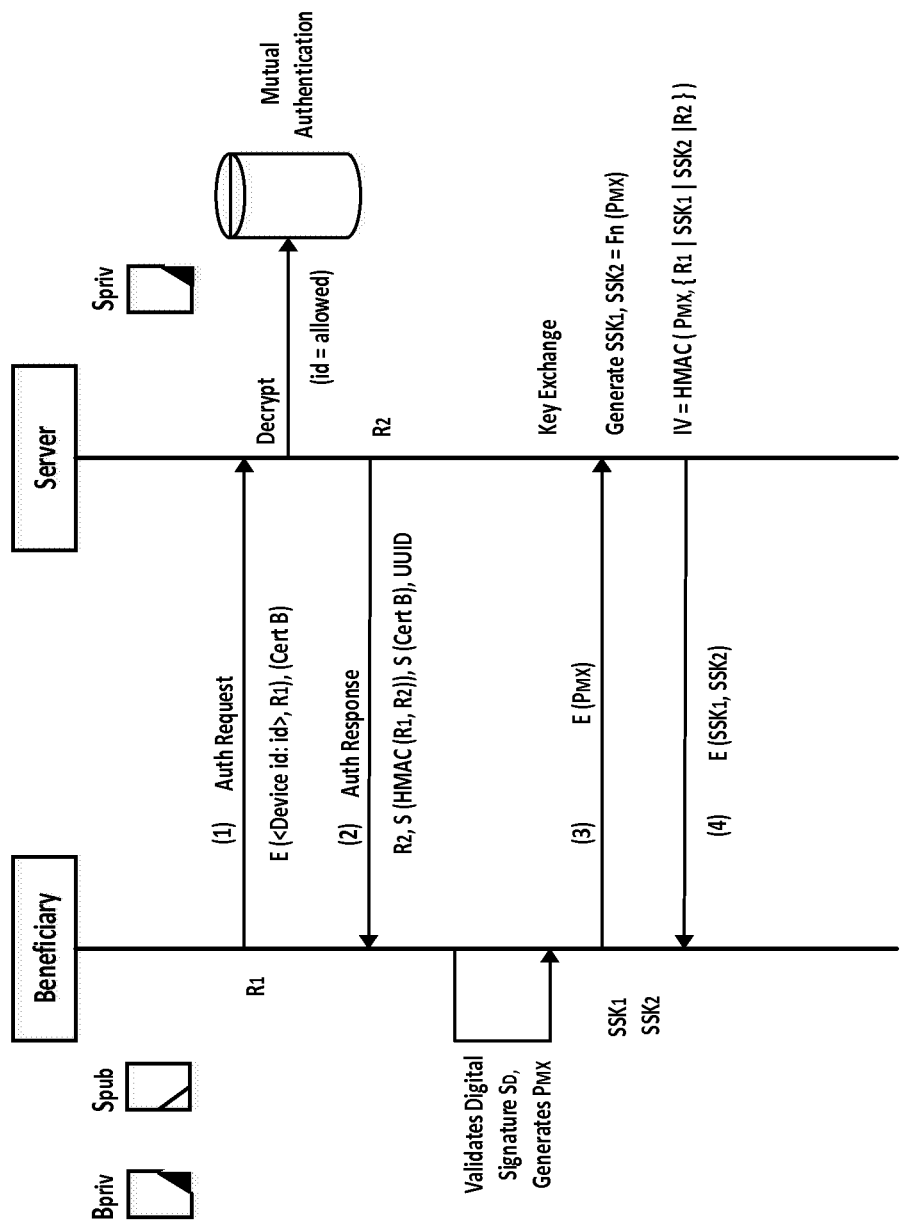
FIG. 3 describes a beneficiary registration algorithm in accordance with some embodiments.

FIG. 3 outlines the beneficiary registration algorithm. For the purposes of illustration, Beneficiary is designated by B and the server is designated by S. As a pre-condition, Beneficiary B contains the server public key Spub.

In Step 1, Beneficiary B sends Auth-Request.
 a. Beneficiary sends Auth-Request, passing in E(device_id, R1), Bcert, where:
  Device_id is a unique device identifier, such as IEMI, MAC address, GUID, etc.
  R1 is a random number
  E is the encrypted data using Spub by encrypting device_id and R1.
  Bcert is the beneficiary's public key
 b. The server decrypts the data using Spriv, where Spriv is the server's private key. If decryption fails, the negotiation is terminated by the server.
 c. The server matches the decrypted device_id with its allowed list. If the match fails, the negotiation is terminated by the server. This step is optional.
 d. The server generates a random number R2.
 e. The server signs Bcert, S(Bcert)

In Step (2), Server sends Auth-Response
 a. Auth-Response contains R2, S(Bcert), UUID and Auth Data Sd, where:
  R2 is the random number generated in step 1.d
  S(Bcert) is the signed certificate of device public key Bcert
  Sd=S(HMAC{R1, R2}), where S is digital signature using Spriv
 b. Beneficiary B validates the digital signature Sd. If the signature validation is successful, B generates a Pre-Master Secret, Pmx.

In Step (3), B sends Key-Exchange Request.
 a. Key-Exchange requests consists of E(Pmx) where E (Pmx)=Encrypted value of Pmx using Spub
 b. Server S decryts Pmx using Spriv.
 c. If decryption is successful, the Server S generates SSK1, SSK2, where SSK1 and SSK2 are Shared Secret Data.
 d. The server S generates the Initialization Vector (IV) as IV=HMAC (Pmx, {R1|SSK1|SSK2|R2}})

In Step (4), S sends Key-Exchange Response
 a. Key-Exchange Response consists of Esd where Esd is derived using Symmetric encryption on SSK1 and SSK2, and additional session parameters utilizing the IV derived in 3.d
 b. The Beneficiary B decrypts Esd and stores SS1 and SSK2. All future communications with the server will utilize keys derived as a function of SSK1 and SSK2.

Figure 4:
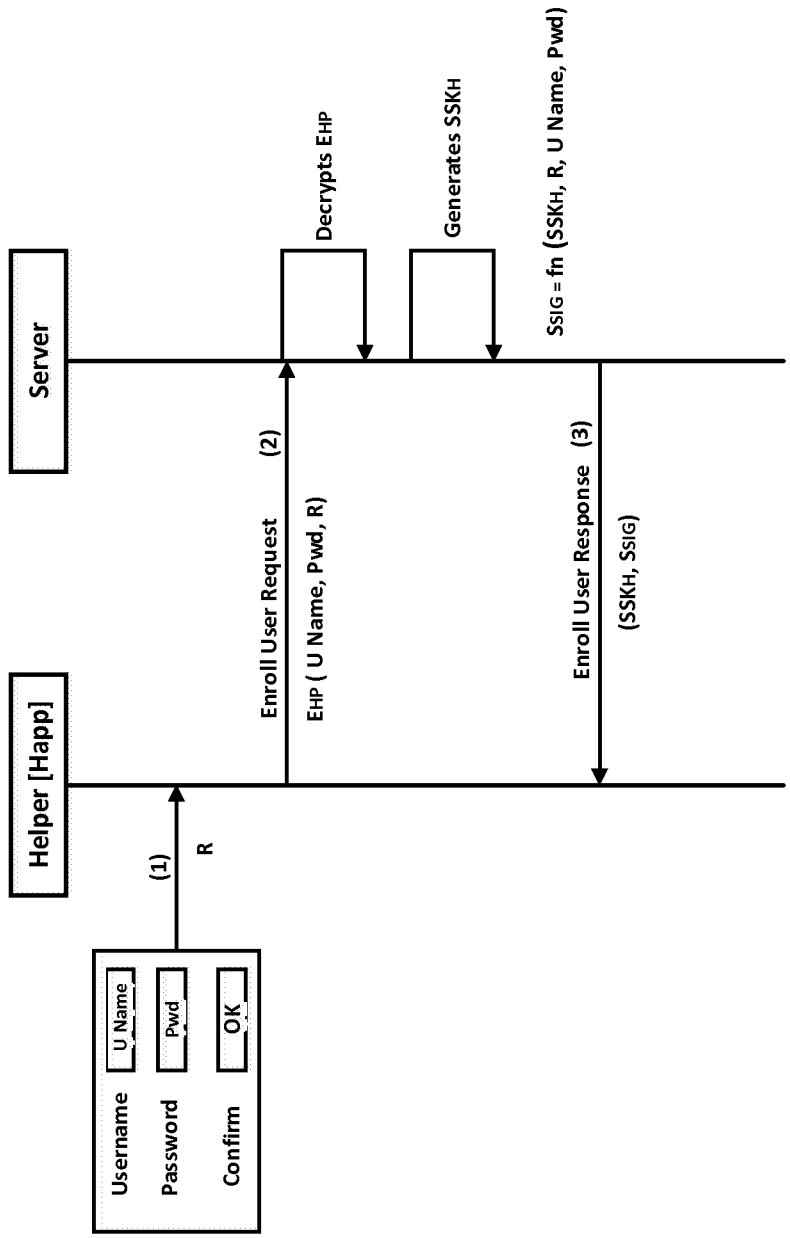
FIG. 4 describes a helper registration algorithm in accordance with some embodiments.

FIG. 4 outlines the Helper registration algorithm. For the purpose of illustration, Helper is designated as H, Helper App is designated as HApp and Server is designated as S. As a pre-condition, the Helper application is installed on the device. Helper invokes the application. HApp contains the server public key Spub.

In Step (1), Helper application presents login screen.
 a. HApp presents a user name and password screen to create a new account. Helper enters unique values for the username, password and reconfirms the password.

In Step (2), HApp transmits Enroll User Request message.
 a. Enroll User Request contains Ehp (username, password, R), where E is the encrypted data using Spub. R is a random number
 b. Server S decrypts Ehp using Spriv, where Spriv is the Server private key.
 c. Upon successful decryption, S registers the user in the system.
 d. S generates SSKh where SSKh is a random number. S also generates a signature Ssig, where Ssig is a function of (SSKh, R, Username, Password)

In Step (3), S transmits EnrollUser Response to HApp. The response contains profile parameters, SSK and Ssig.
 a. HApp validates Ssig. If signature validation is successful, HApp stores profile parameters and SSKh.

Figure 5:
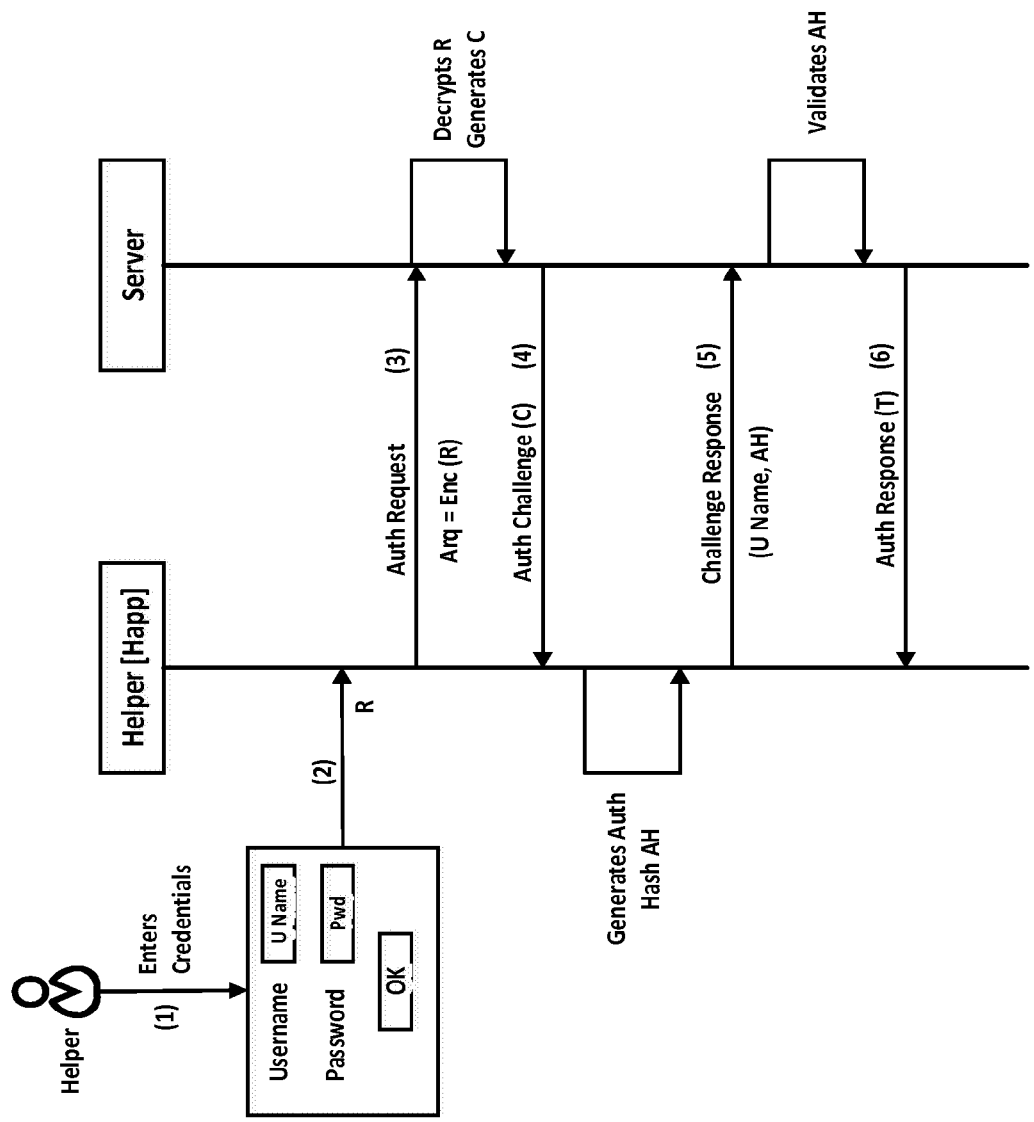
FIG. 5 describes a helper authentication procedure in accordance with some embodiments.

FIG. 5 outlines the helper authentication process. As a pre-condition, Helper App [HApp] is installed on the Helper's device and is registered with the server S. The Helper H further shares a valid username and password with the server.

1. HApp presents username and password screen to Helper H.
2. The HApp validates the user input. Upon successful user input validation, HApp creates an Authentication Request Arq.
 a. Arq consists of random R encrypted with Spub
3. HApps transmits the Authentication Request Arq to Server S.
 a. Server S decrypts R using Spriv
 b. Server S generates a challenge C, where C is a random.
 c. R is temporarily cached in S.
4. S transmits Authentication Challenge C to HApp.
 a. HApp generates authentication hash AH, where AH is a cryptographic hash function derived from R, C, SSK and password.
5. HApp transmits username and AH to Server S.
 a. Server validates AH against the user account.
6. Server generates authentication token T and transmits T to HApp.

Figure 6:
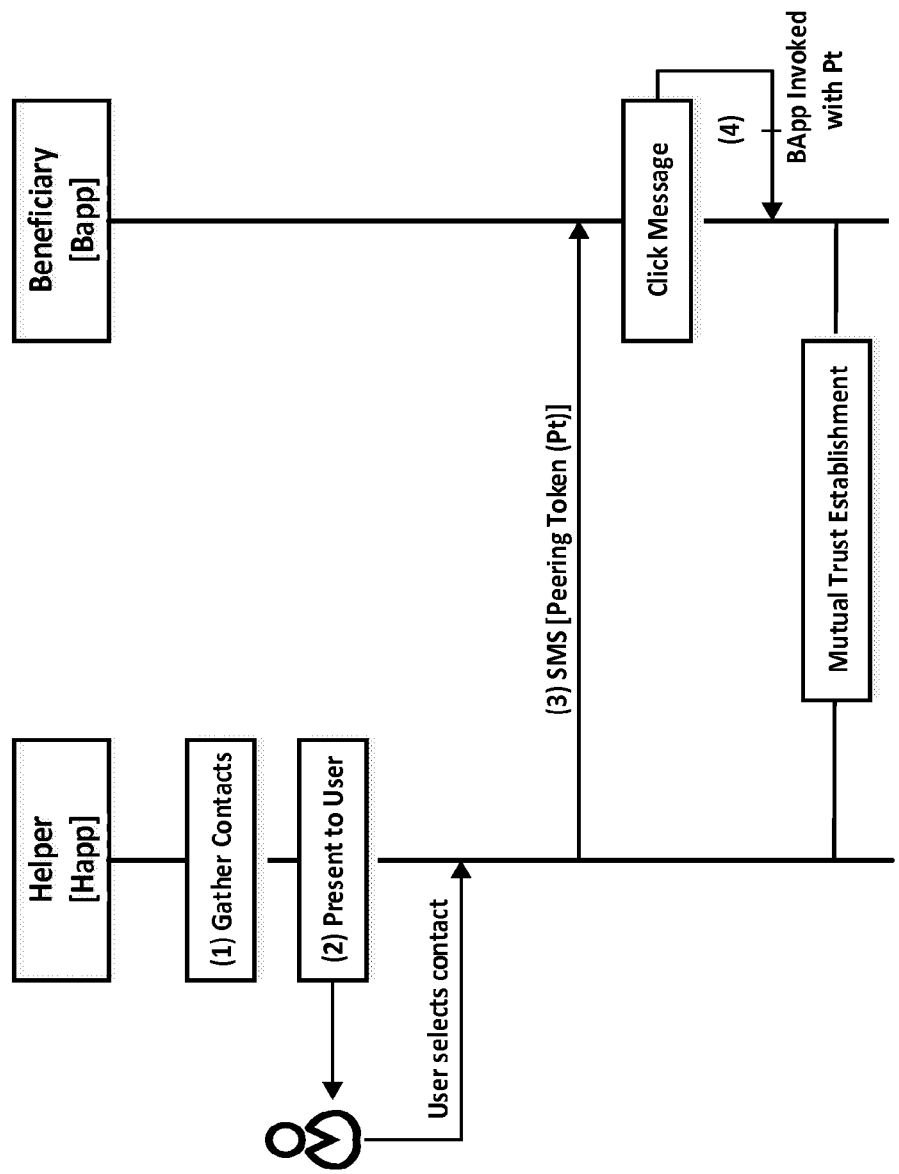
FIG. 6 describes a beneficiary discovery process using existing contacts on the helper smart device in accordance with some embodiments.
Figure 7:
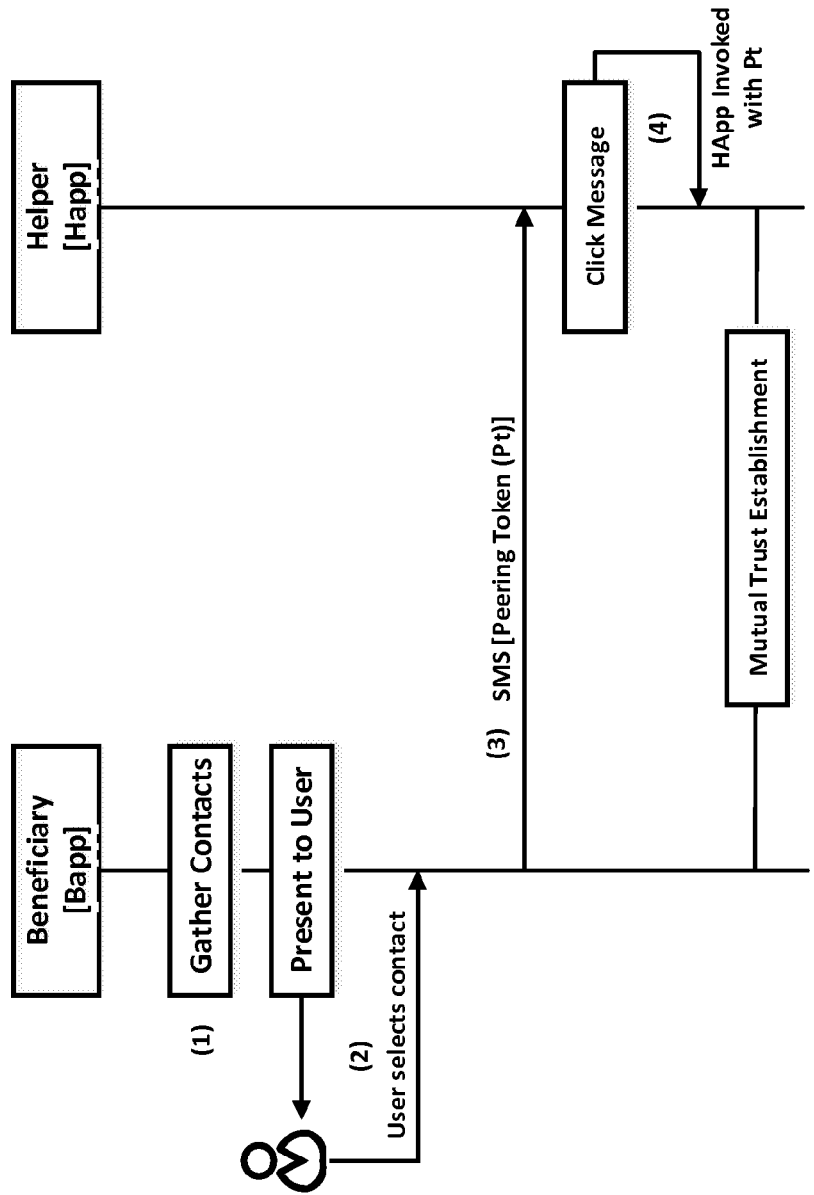
FIG. 7 describes a helper discovery using existing contacts on the beneficiary smart device in accordance with some embodiments.

FIGS. 6 and 7 outline Helper-Beneficiary Discovery procedure using existing contacts on the helper or beneficiary device. When peering help solicitation is to be requested either by Helper or Beneficiary the HApp or BApp performs an auto-scan on the respective devices and gathers all contacts including those within $3^{rd}$ party social media applications (1). These contacts are then presented to the user (Helper or Beneficiary) (2). Upon selection of a contact, the initiating application [HApp/BApp] sends out a specially crafted message with a Peering Token (Pt) to the recipient application [HApp/BApp]. If the contact happens to be part of the phone contact list, an SMS will be sent (3). When the recipient (Helper or Beneficiary) receives this message and clicks on the message, HApp or BApp is invoked automatically and the Peering token (Pt) is passed to it as a parameter (4). This Peering Token Pt is used for mutual trust establishment.

Figure 8:
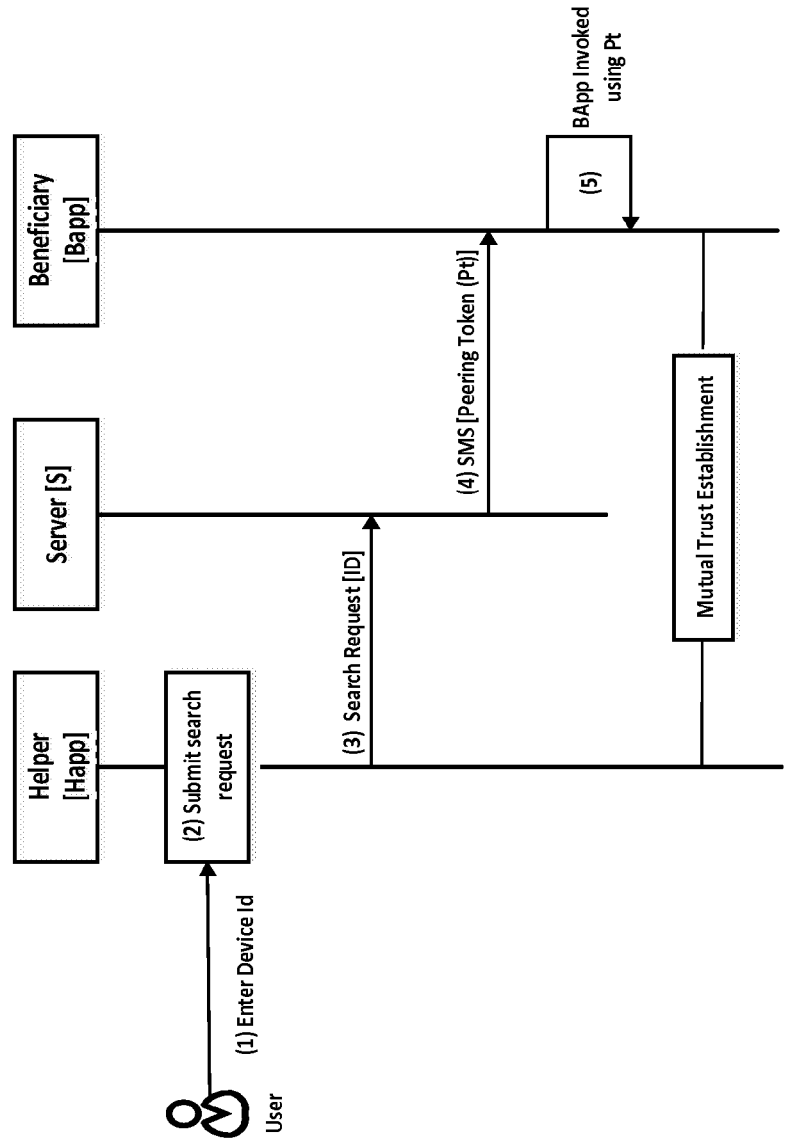
FIG. 8 describes a helper-beneficiary discovery using a secure server in accordance with some embodiments.

FIG. 8 outlines the Helper-Beneficiary Discovery procedure using the Server S. In FIG. 8, Helper HApp is used as the initiator of the discover procedure request and BApp is used as the recipient for illustration purposes only. But in other scenario either of them can be the initiator of discovery procedure. In any event, helper beneficiary discovery needs to be performed directly using server S, either the Helper or the Beneficiary can enter a device identifier like phone number, user name, and the like from within the respective application (1). Once the device identifier is entered, the search request is submitted within the respective application (2). The search request is then forwarded to the Server S along with the device identifier (3). If the search yields a positive match within the server S, the server will forward the Peering Token (Pt) to the other peer (4). The recipient application [HApp/BApp] is invoked using the peering token Pt (5). Mutual trust is established between the two after discovery is complete.

Figure 9:
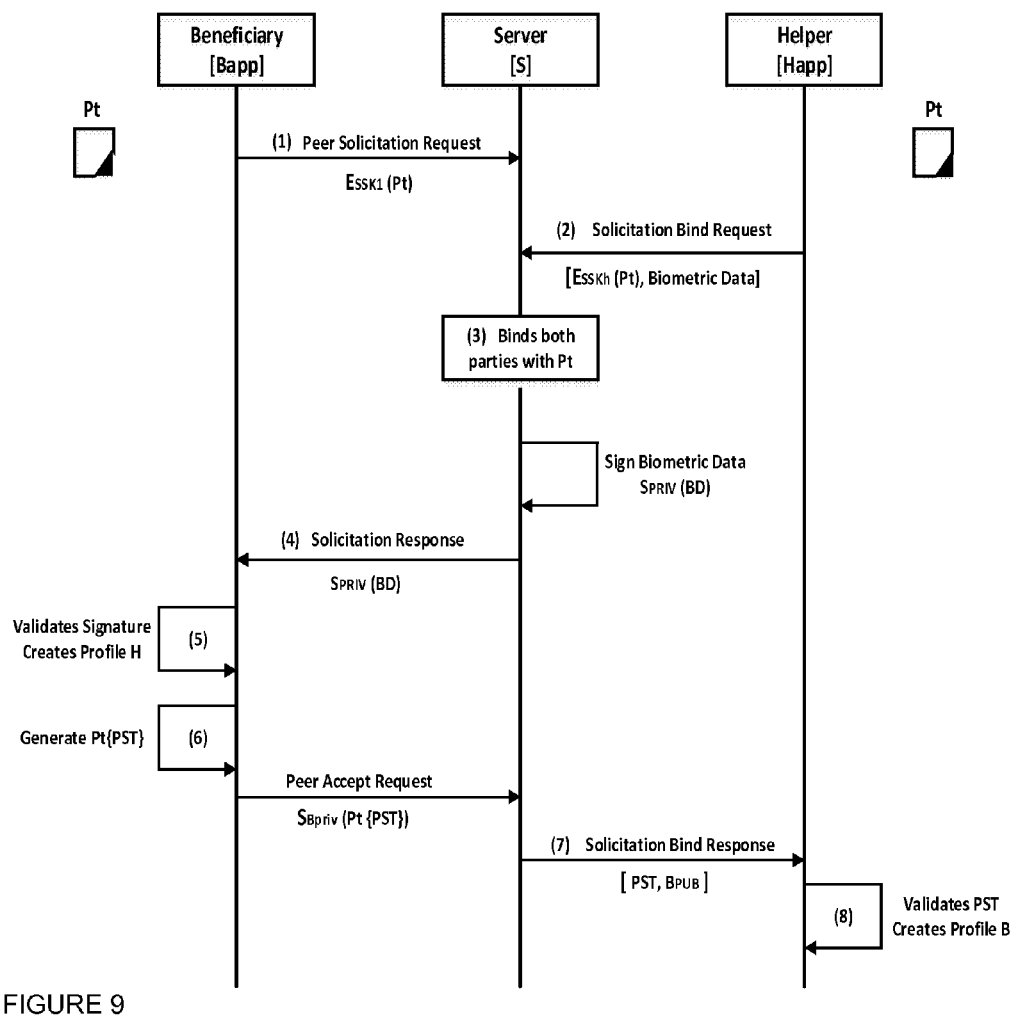
FIG. 9 describes a helper-beneficiary mutual trust establishment procedure in accordance with some embodiments.

FIG. 9 outlines the Helper-Beneficiary Mutual Trust Establishment. As a pre-condition, HApp and BApp share the same Peering Token (Pt). BApp and HApp are pre-authenticated with S.

1. BApp sends Peer Solicitation Request to the Server S. Solicitation Request contains the Peering Token (Pt) encrypted with SSK1.
2. HApp sends Solicitation Bind Request to the Server S. Solicitation Bind Request contains the Peering Token (Pt) encrypted with SSKh. In addition, the HApp sends additional biometric data for additional confirmation, such as a self-image of the Helper captured instantaneously from the device camera, or a voice recording snippet, fingerprint, etc.
3. Server successfully binds both parties with the Pt.
4. Server signs the biometric data using the Spriv and forwards it as part of Solicitation Response to BApp.
5. BApp validates the signature and if successful presents the biometric data to the Beneficiary B. If B approves it, BApp creates a profile for H.
6. BApp generates a Peer-Secret Token (PST). PST is a function of Pt. BApp signs the data with Bpriv. This is forwarded to S as part of Peer Accept Request.
7. S forwards PST to HApp, along with Bpub as part of Solicitation Bind Response.
8. HApp validates PST and if successful, creates a profile for B.

Figure 10:
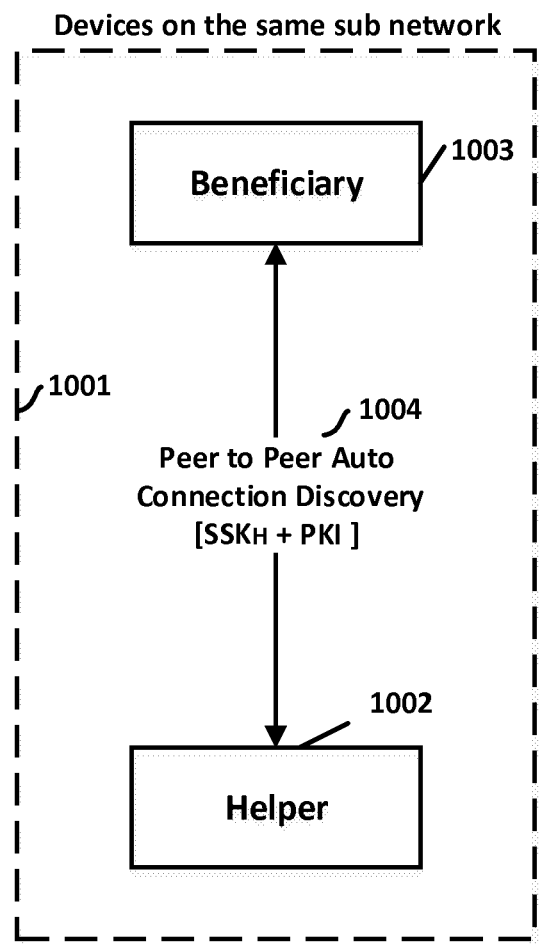
FIG. 10 describes an auto connection discovery between the helper and beneficiary in accordance with some embodiments.
Figure 11:
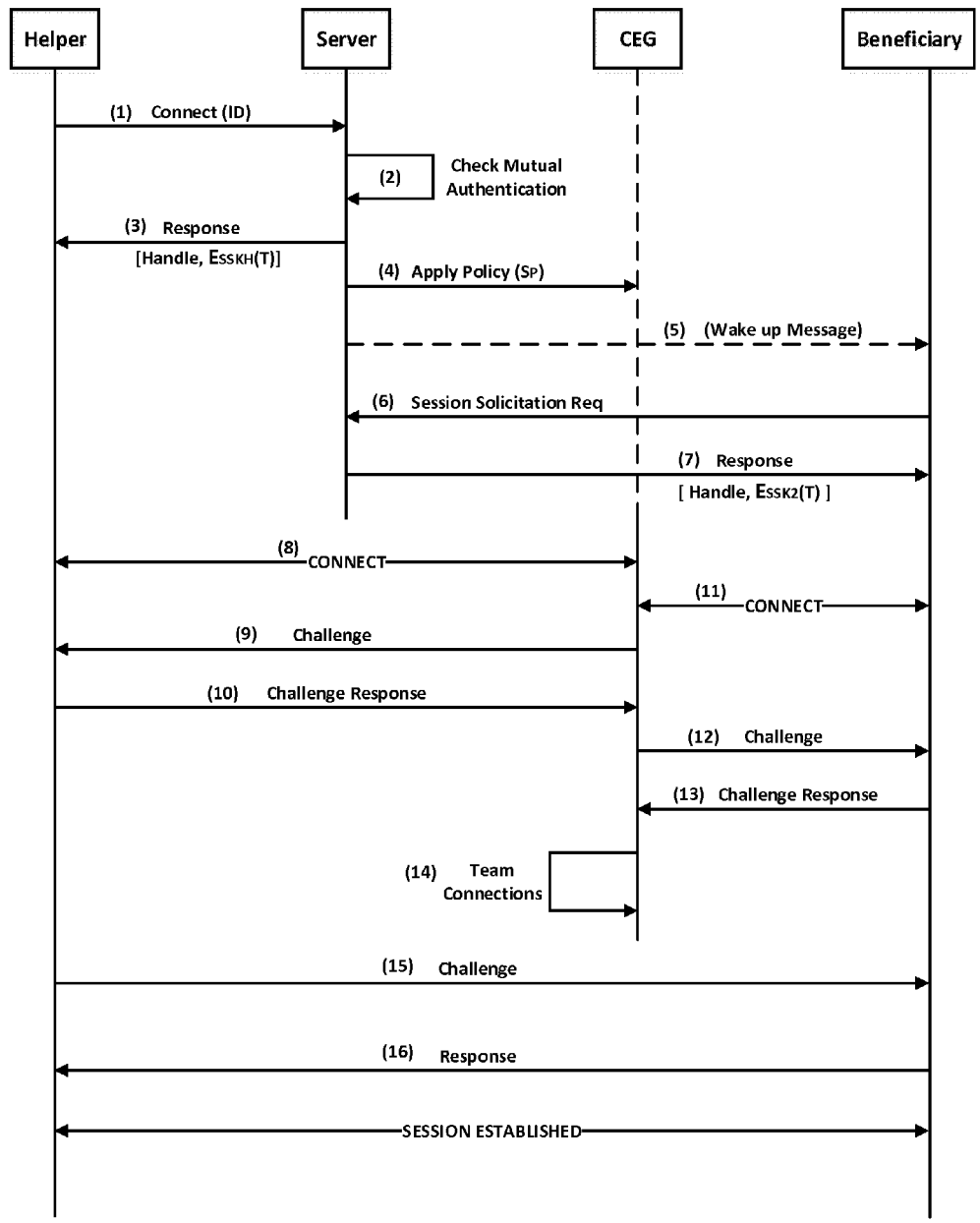
FIG. 11 describes a connection discovery process when auto connection discovery fails in accordance with some embodiments.

FIG. 10 outlines the Auto connection discovery process between the helper device and the beneficiary's device when both are in the same sub network 1001. While in the same sub network, the Helper H 1002 and Beneficiary B 1003 will use the shared secret data SSKH and Public Key Infrastructure 1004 to mutually authenticate each other and establish a peer to peer connection. This is explained in greater detail with respect to FIG. 10 and FIG. 11.

FIG. 11 outlines the process that occurs when the Helper and the Beneficiary are unable to mutually authenticate each other. The Server S and in particular the Communication Endpoint Gateway [CEG] which is a component of the Server S assists in the peer to peer connection establishment process. The Helper H transmits Session Request to Server S, passing the device ID to which a connection is requested (1). S checks internally if H is authorized to connect to Beneficiary B (2). S transmits Session Response passing in the Session Handle and a Random Session Token (ST) to Helper H (3). The ST is encrypted with SSKh. S transmits a Session Policy to CEG (4). S sends a wakeup message to B (5). B connects to S and transmits a Session Solicitation Request (6). S transmits a Session Handle and ST. ST is encrypted with SSK2 (7). H establishes connection with CEG (8). CEG transmits Challenge to H (9). H transmits Challenge-Response to CEG (10). Independently B establishes connection with CEG (11). CEG transmits Challenge to B (12). B transmits Challenge-Response to CEG (13). Upon mutual authentication of H and B with CEG connections, CEG teams the connections (14). H transmits Challenge to B (15). B transmits Challenge-Response to H (16). If H and B mutually authenticate each other, the peer to peer connection is established, at which point, control messages are transmitted between H and B.

Figure 12:
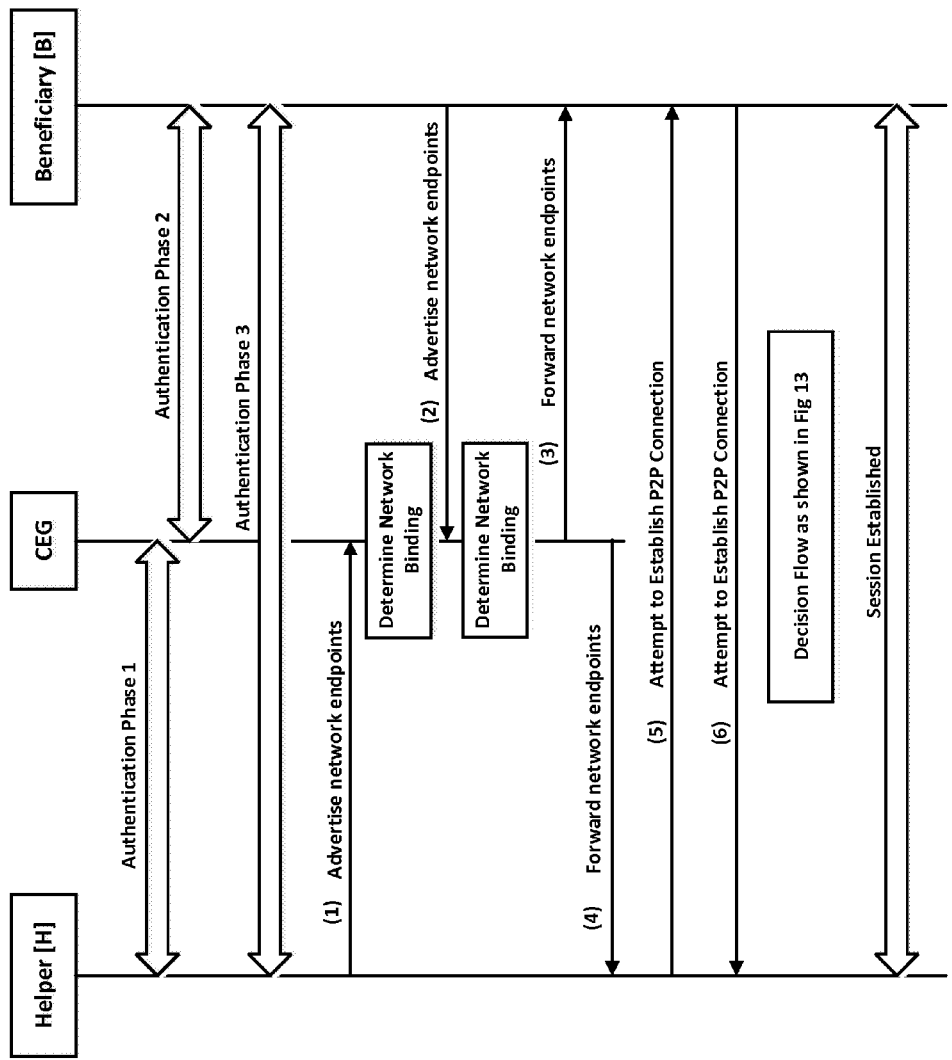
FIG. 12 describes a peer to peer network discovery process in accordance with some embodiments.

FIG. 12 outlines the peer to peer network discovery procedure. As a pre-condition, the Beneficiary is mutually authenticated with the CEG. The Helper is mutually authenticated with the CEG. The Helper is mutually authenticated with the Beneficiary. Before establishing a peer to peer remote control management session, the helper and the beneficiary go through the process of network discovery to determine if the peer to peer connection can be established directly [Peer to Peer] without the assistance of the CEG. In order to achieve this, the Helper H advertises its network endpoints which include its IP Address and Port to the CEG [1]. The Beneficiary B also advertises its network endpoints which include its IP Address and Port to the CEG [2]. The CEG determines the network binding of the Helper H and forwards the network endpoints to Beneficiary B [3]. The CEG also determines the network binding of the Beneficiary B and forwards the network endpoints to Helper H [4]. Once the Helper H and Beneficiary B have each other's network endpoints, both try to establish a peer to peer connection with each other independently [5] and [6]. The outcome of the P2P connection attempts from helper H and beneficiary B is dependent on the decision flow described in FIG. 13.

Figure 13:
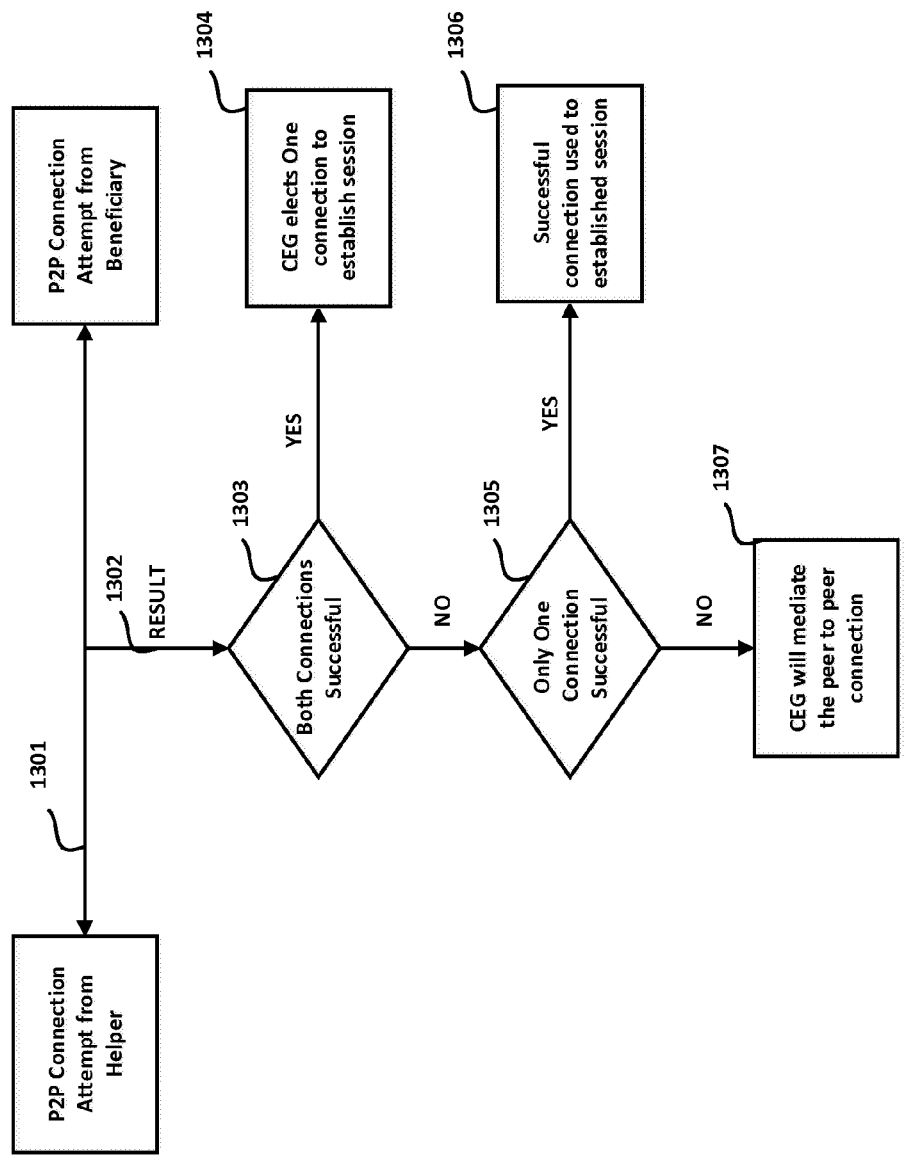
FIG. 13 describes a decision flow executed during a peer to peer remote control management session establishment in accordance with some embodiments.

FIG. 13 outlines the decision flow that occurs after the Helper and beneficiary have attempted to establish a peer to peer connection to each other. As described above the Helper and Beneficiary attempt to establish a peer to peer connection with each other [1301]. The status of this connection attempt is forwarded to the CEG [1302]. The CEG checks if both the attempts were successful [1303]. If both the Helper and the Beneficiary were successful is establishing the connection, then the CEG will decide which connection should remain open and be used for the peer to peer remote control management session and which connection should be terminated [1304]. If only one attempt was successful [1305], then the successful connection is used for the peer to peer remote control management session [1306]. If both the attempts failed to result in a peer to peer connection, then the CEG will take control and mediate the peer to peer connection between the Helper and Beneficiary [1307].

Figure 14:
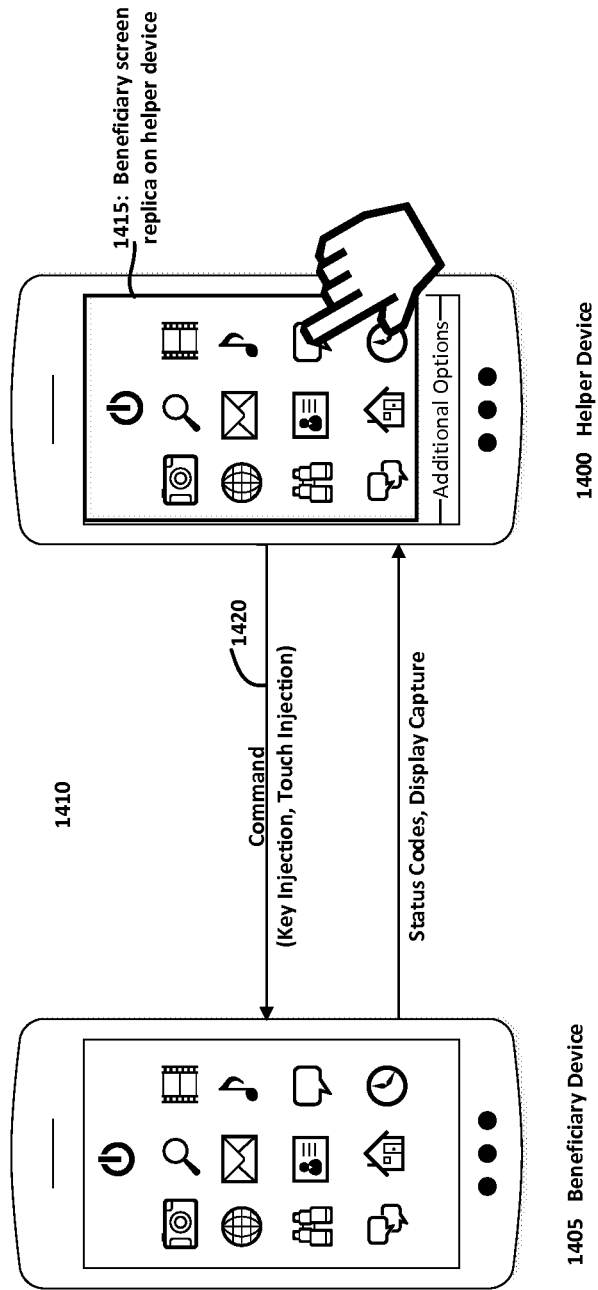
FIG. 14 shows an exemplary user interface on the helper and beneficiary device during a peer to peer remote control management process in accordance with some embodiments.

FIG. 14 shows an example of how the user interface on helper smart device 1400 and beneficiary smart device 1405 might look during a peer to peer remote control management session 1410. Once the helper application and the beneficiary application establish mutual trust with one another and the peer to peer connection is established, the helper can then remotely view and control the beneficiary's device from within the helper application [HApp] in real time during a peer to peer remote control management session 1410. The helper can perform actions like touch, swipe, and scroll on the helper application user interface 1415 which will be sent to the beneficiary's smart device 1405 as a command 1420. The command is executed on the beneficiary's smart device.

In general, a method for providing peer to peer remote control management between a helper smart device and a beneficiary smart device, includes registering, by the helper smart device and the beneficiary smart device, with a secure server; authenticating, by the helper smart device, with the secure server; performing a discovery by at least one of the helper smart device and the beneficiary smart device with respect to at least the other of the helper smart device and the beneficiary smart device; establishing a trust relationship between the helper smart device and the beneficiary smart device by performing mutual authentication between the helper smart device and the beneficiary smart device; performing an auto connection discovery process to determine if the helper smart device and the beneficiary smart device are on a same sub network; establishing a peer to peer connection between the helper smart device and the beneficiary smart device for performing a peer to peer remote control management session on a condition that the helper smart device and the beneficiary smart device are on the same sub network; and using the secure server to mediate discovery, establishment and maintenance of a peer to peer connection between the helper smart device and the beneficiary smart device for performing a peer to peer remote control management session on a condition that the helper smart device and the beneficiary smart device are on different sub networks.

In general, a system for providing peer to peer remote control management between a helper smart device and a beneficiary smart device, includes a secure server, a helper smart device configured to register and authenticate with secure server; and a beneficiary smart device configured to register with the secure server. One of the helper smart device and the beneficiary smart device is configured to perform discovery with a remaining one of the helper smart device and the beneficiary smart device. The helper smart device and the beneficiary smart device is configured to establish a trust relationship between the helper smart device and the beneficiary smart device by performing mutual authentication between the helper smart device and the beneficiary smart device. The helper smart device and the beneficiary smart device is configured to perform an auto connection discovery process to determine if the helper smart device and the beneficiary smart device are on a same sub network. The helper smart device and the beneficiary smart device is configured to establish a peer to peer connection between the helper smart device and the beneficiary smart device for performing a peer to peer remote control management session on a condition that the helper smart device and the beneficiary smart device are on the same sub network. The helper smart device and the beneficiary smart device is configured to use the secure server to mediate discovery, establishment and maintenance of a peer to peer connection between the helper smart device and the beneficiary smart device for a peer to peer remote control management session on a condition that the helper smart device and the beneficiary smart device are on different sub networks Accordingly, in an embodiment, the helper smart device is able to remotely view, operate, control, and draw on beneficiary smart device during the peer to peer remote control management session.

In an embodiment, a remote support request is initiated by sending a text message to a contact on at least one of the helper smart device and the beneficiary smart device. The remote support request is initiated by sending an email message to a contact on at least one of the helper smart device and the beneficiary smart device. In an embodiment, the remote support application is pre-installed on the helper smart device. In an embodiment, the remote support application is downloaded upon request on the helper smart device.

In an embodiment, a remote support application is pre-installed on the beneficiary smart device. In an embodiment, the remote support application is downloaded upon request on the beneficiary smart device. In an embodiment, the beneficiary smart device is mapped onto the helper smart device enabling remote view and operation of the beneficiary smart device in real time.

In an embodiment, the helper smart device is able to annotate on the beneficiary smart device. In an embodiment, security policies prevent the helper smart device from viewing a pre-defined set of private applications. In an embodiment, the security policies require beneficiary permission to access personal applications. In an embodiment, the security policies allow access to only certain applications.

In an embodiment, a helper remote support application enables to switch active and background on the helper smart device.

In an embodiment, the peer to peer remote control management session is re-established due to network drop and failure. In an embodiment, the peer to peer remote control management session is paused from the beneficiary's smart device. In an embodiment, the paused peer to peer remote control management session is resumed from the beneficiary's smart device.

In an embodiment, private data entry fields on the beneficiary smart device are not visible on the helper smart device.

In an embodiment, at least one of the helper smart device and beneficiary smart device can terminate the peer to peer remote control management session.

While detailed embodiments of the instant invention are disclosed herein, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the technology to variously employ the present invention in virtually any appropriately detailed structure.

Although features and elements are described above in particular combinations, each feature or element can be used alone without the other features and elements or in various combinations with or without other features and elements.

What is claimed is:

1. A method for providing peer to peer remote control management between a helper smart device and a beneficiary smart device, comprising:
   registering, by the helper smart device and the beneficiary smart device, with a secure server;
   authenticating, by the helper smart device, with the secure server;
   performing a discovery by at least one of the helper smart device and the beneficiary smart device with respect to at least the other of the helper smart device and the beneficiary smart device;
   establishing a trust relationship between the helper smart device and the beneficiary smart device by performing mutual authentication between the helper smart device and the beneficiary smart device;
   performing an auto connection discovery process to determine if the helper smart device and the beneficiary smart device are on a same sub network;
   establishing a peer to peer connection between the helper smart device and the beneficiary smart device for performing a peer to peer remote control management session on a condition that the helper smart device and the beneficiary smart device are on the same sub network; and
   using the secure server to mediate discovery, establishment and maintenance of a peer to peer connection between the helper smart device and the beneficiary smart device for performing a peer to peer remote control management session on a condition that the helper smart device and the beneficiary smart device are on different sub networks.

2. The method of claim 1, wherein the helper smart device is able to remotely view, operate, control, and draw on beneficiary smart device during the peer to peer remote control management session.

3. The method of claim 1, wherein a remote support request is initiated by sending a text message to a contact on at least one of the helper smart device and the beneficiary smart device.

4. The method of claim 1, wherein a remote support request is initiated by sending an email message to a contact on at least one of the helper smart device and the beneficiary smart device.

5. The method of claim 1, wherein a remote support application is pre-installed on the helper smart device.

6. The method of claim 1, wherein a remote support application is downloaded upon request on the helper smart device.

7. The method of claim 1, wherein a remote support application is pre-installed on the beneficiary smart device.

8. The method of claim 1, wherein a remote support application is downloaded upon request on the beneficiary smart device.

9. The method of claim 1, wherein the beneficiary smart device is mapped onto the helper smart device enabling remote view and operation of the beneficiary smart device in real time.

10. The method of claim 1, wherein the helper smart device is able to annotate on the beneficiary smart device.

11. The method of claim 1, wherein security policies prevent the helper smart device from viewing a pre-defined set of private applications.

12. The method of claim 1, wherein security policies require beneficiary permission to access personal applications.

13. The method of claim 1, wherein security policies allow access to only certain applications.

14. The method of claim 1, wherein a helper remote support application enables to switch active and background on the helper smart device.

15. The method of claim 1, wherein the peer to peer remote control management session is re-established due to network drop and failure.

16. The method of claim 1, wherein the peer to peer remote control management session is paused from the beneficiary's smart device.

17. The method of claim 14, wherein the paused peer to peer remote control management session is resumed from the beneficiary's smart device.

18. The method of claim 1, wherein private data entry fields on the beneficiary smart device are not visible on the helper smart device.

19. The method of claim 1, wherein at least one of the helper smart device and beneficiary smart device can terminate the peer to peer remote control management session.

20. A system for providing peer to peer remote control management between a helper smart device and a beneficiary smart device, comprising:
a secure server;
a helper smart device configured to register and authenticate with secure server;
a beneficiary smart device configured to register with the secure server;
one of the helper smart device and the beneficiary smart device configured to perform discovery with a remaining one of the helper smart device and the beneficiary smart device;
the helper smart device and the beneficiary smart device configured to establish a trust relationship between the helper smart device and the beneficiary smart device by performing mutual authentication between the helper smart device and the beneficiary smart device;
the helper smart device and the beneficiary smart device configured to perform an auto connection discovery process to determine if the helper smart device and the beneficiary smart device are on a same sub network;
the helper smart device and the beneficiary smart device configured to establish a peer to peer connection between the helper smart device and the beneficiary smart device for performing a peer to peer remote control management session on a condition that the helper smart device and the beneficiary smart device are on the same sub network; and
the helper smart device and the beneficiary smart device configured to use the secure server to mediate discovery, establishment and maintenance of a peer to peer connection between the helper smart device and the beneficiary smart device for a peer to peer remote control management session on a condition that the helper smart device and the beneficiary smart device are on different sub networks.

21. The system of claim 20, wherein the helper smart device is able to remotely view, operate, control, and draw on beneficiary smart device during the peer to peer remote control management session.

22. The system of claim 20, wherein a remote support request is initiated by sending a text message to a contact on the at least one of the helper smart device and the beneficiary smart device.

23. The system of claim 20, wherein a remote support request is initiated by sending an email message to a contact on at least one of the helper smart device and the beneficiary smart device.

24. The system of claim 20, wherein a remote support application is pre-installed on the helper smart device.

25. The system of claim 20, wherein a remote support application is downloaded upon request on the helper smart device.

26. The system of claim 20, wherein a remote support application is pre-installed on the beneficiary smart device.

27. The system of claim 20, wherein a remote support application is downloaded upon request on the beneficiary smart device.

28. The system of claim 20, wherein the beneficiary smart device is mapped onto the helper smart device enabling remote view and operation of the beneficiary smart device in real time.

29. The system of claim 20, wherein the helper smart device is able to annotate on the beneficiary smart device.

30. The system of claim 20, wherein security policies prevent the helper smart device from viewing a pre-defined set of private applications.

31. The system of claim 20, wherein security policies require beneficiary permission to access personal applications.

32. The system of claim 20, wherein security policies allow access to only certain applications.

33. The system of claim 20, wherein a helper remote support application enables to switch active and background on the helper smart device.

34. The system of claim 20, wherein the peer to peer remote control management session is re-established due to network drop and failure.

35. The system of claim 20, wherein the peer to peer remote control management session is paused from the beneficiary's smart device.

36. The system of claim 35, wherein the paused peer to peer remote control management session is resumed from the beneficiary's smart device.

37. The system of claim 20, wherein private data entry fields on the beneficiary's smart device are not visible on the helper's smart device.

38. The system of claim 20, wherein at least one of the helper smart device and beneficiary smart device can terminate the remote control management session.

* * * * *